United States Patent [19]

Baker

[11] Patent Number: 5,123,751

[45] Date of Patent: Jun. 23, 1992

[54] SYSTEMS FOR SENSING PRESSURE AND TEMPERATURE AT A COMMON LOCATION

[75] Inventor: Peter D. Baker, Basingstoke, England

[73] Assignee: Smiths Industries Public Limited Company, London, England

[21] Appl. No.: 775,350

[22] Filed: Oct. 15, 1991

Related U.S. Application Data

[60] Division of Ser. No. 692,976, Apr. 29, 1991, which is a continuation of Ser. No. 544,624, Jun. 27, 1990, abandoned.

[30] Foreign Application Priority Data

Jul. 29, 1989 [GB] United Kingdom ............... 8917389
Aug. 25, 1989 [GB] United Kingdom ............... 8919385

[51] Int. Cl.$^5$ .................. G01J 1/04; G01K 13/02; G01L 1/24
[52] U.S. Cl. .............................. 374/143; 250/227.11; 374/130
[58] Field of Search ............... 374/143, 117, 118, 130

[56] References Cited

U.S. PATENT DOCUMENTS

| | | | |
|---|---|---|---|
| 3,318,152 | 5/1967 | Thompson et al. | 374/117 X |
| 4,523,092 | 6/1985 | Nelson | 374/143 X |
| 4,541,731 | 9/1985 | Bell et al. | 374/117 |
| 4,650,346 | 3/1987 | Tehon | 374/119 X |
| 4,837,777 | 6/1989 | Jones et al. | 374/143 |

FOREIGN PATENT DOCUMENTS 2161931 1/1986 United Kingdom .

OTHER PUBLICATIONS

Patent Abstracts of Japan, vol. 10 No. 266, p. 496 (2322) Sep. 11, 1986, (T. Nishijami).

Primary Examiner—Daniel M. Yasich
Attorney, Agent, or Firm—Pollock, Vande Sande & Priddy

[57] ABSTRACT

A probe has an inlet and outlet by which a fluid flows over an optical sensing element in the sensing probe. Broad band optical radiation is supplied to the element and radiation transmitted through the optical sensing element is supplied to three photodiodes responsive respectively to radiation at different wavelengths. The transmission characteristic of the optical sensing element varies in different ways with change in temperature and pressure respectively. A store of temperature and pressure against amplitude of radiation at different wavelengths is addressed by the outputs of the photodiodes to give an indication of pressure and temperature at the sensing element.

1 Claim, 1 Drawing Sheet

SYSTEMS FOR SENSING PRESSURE AND TEMPERATURE AT A COMMON LOCATION

This is a divisional of application Ser. No. 07/692,976 filed on Apr. 29, 1991, which is a continuation of application Ser. No. 07/544,624 filed Jun. 27, 1990, now abandoned.

BACKGROUND OF THE INVENTION

This invention relates to sensing systems.

The invention is more particularly concerned with sensing systems for use in measuring temperature and pressure.

It is common practice, in the electronic control of jet engines, to measure particular engine parameters, i.e. shaft speed, gas temperature and gas pressure, to determine engine conditions for control of fuel flow in response to a demand for power. Where particular parameters are necessary but are not readily available for the mathematical gas model, these can be obtained from others by inference.

The measurement of gas pressure and temperature are carried out by different sensors, such as, for example a pitot probe and a thermocouple junction respectively. Because of the gas flow conditions in jet engines, the pressure and temperature at closely spaced points can be very different. The usefulness of the pressure and temperature readings is, therefore, reduced because they relate to values at different locations in the gas flow. Using two sensors can also have the disadvantage that, if they are closely spaced, in an attempt to provide readings in respect of the same location, one sensor can alter the value sensed by the other sensor. For example, the pressure sensor may act as a heat sink and affect the temperature detected by the temperature sensor; the temperature sensor may interfere with gas flow over the pressure sensor and thereby affect the pressure reading Using two separate sensors and their associated cabling also leads to an increase in the total size and weight. In aircraft applications it can be advantageous to make as few as possible openings through the engine casing or aircraft skin; the need to mount two separate sensors can therefore be an additional disadvantage for this reason.

BRIEF SUMMARY OF THE INVENTION

It is an object of the present invention to provide a sensing system that can be used to alleviate these disadvantages.

According to one aspect of the present invention there is provided a sensing system arranged to provide an output in respect of both pressure and temperature, the system including a sensing element responsive to both pressure and temperature which provides an output signal that varies in accordance with both change in pressure and change in temperature at the same location, and means for determining from the output signal separate indications of pressure and temperature.

The sensing element is preferably located in a probe having a fluid inlet and outlet such that fluid flows through the probe between the inlet and outlet over the sensing element. The sensing element may include an optical element the properties of which vary in accordance with changes in temperature and pressure The optical element may have optical transmission properties which vary in accordance with changes in temperature and pressure. The system may include a source of broad band optical radiation, means for supplying the radiation to the optical element, and means for measuring the amplitude of radiation from the sensing element at different wavelengths. The means for measuring the amplitude of radiation preferably includes a plurality of optical radiation detectors each of which are responsive respectively to radiation at different wavelengths. The system may include store means containing information as the values of temperature and pressure associated with different amplitudes of radiation at different wavelengths.

According to another aspect of the present invention there is provided a sensing system arranged to provide an output in respect of both pressure and temperature, the system including a source of broad band optical radiation, an optical element having optical transmission properties which vary in one way with change in temperature and in a different way with change in pressure, means for supplying the radiation to the optical element, optical radiation detector means that is arranged to provide output signals in respect of the amplitude of radiation transmitted by the optical element at different wavelengths, and processing means arranged to provide separate indications of pressure and temperature from the output signals of the detector means.

Alternatively, the sensing element may be a vibrating device having a resonant frequency dependent on pressure and a Q that is dependent on temperature. Q, sometimes referred to as a figure of merit or a quality factor, is a parameter used by persons skilled in the art to indicate the extent of damping of a vibrating system. See, for example, Van Nostrand's *Scientific Encyclopedia*, Third Edition, page 1336 (1958). It is known that the Q of a system varies with temperature, e.g., see Tehon U.S. Pat. No. 4,650,346 at column 8, lines 19-37. A system using such a sensing element may include means to excite the vibrating device optically or a piezoelectric means which is arranged to excite the vibrating device into vibration, the output of the vibrating device being supplied at its frequency of vibration to detector means as above, whose output is supplied, as above, to processing means operative to provide separate indications of pressure and temperature in accordance with the frequency and Q, respectively, of the sensing element.

A system in accordance with the present invention will now be described, by way of example, with reference to the accompanying drawings.

DETAILED DESCRIPTION OF PREFERRED EMBODIMENT

Figure 1:
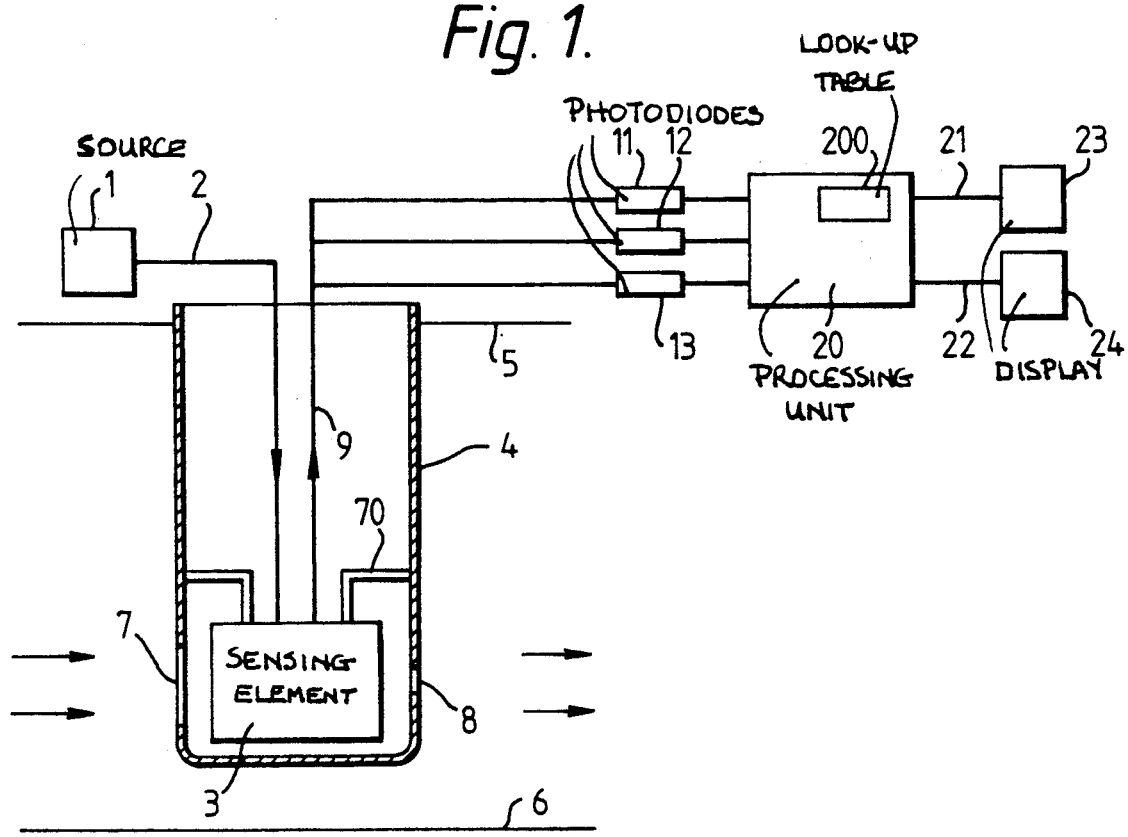
FIG. 1 shows the system schematically.

With reference to FIG. 1, the sensor system includes a source 1 that supplies broad band alternating optical radiation via a fibre-optic cable 2 to a sensing element 3. The sensing element 3 is located at one end of a metal probe 4 which projects into a stream of gas flowing along ducting 5 of an engine 6. The probe 4 has an inlet hole 7 and an outlet hole 8 in the region of the sensing element 3. The inlet hole 7 has a relatively large diameter and faces upstream; the outlet hole 8 has a smaller diameter and faces downstream. The probe 4 has a partition 70 which separates its forward end, including the inlet and outlet holes 7 and 8, from the rear end. The sensing element 3 is mounted on the partition 70 so that one part of the element is subjected to pressure within the forward end of the probe 4 and another part of the element is subjected to pressure on the opposite side of the partition at the rear end of the probe. In operation, the gas is brought nearly to a stand-still within the forward end of probe, giving up its energy at a pressure slightly in excess of ambient. Gas vents from the outlet hole 8 so that the immediate environment of the sensing element 3 is refreshed in step with the environment around the probe tip.

The output of the sensing element 3 is supplied via an optical cable 9 that extends along the probe 4 to three parallel photodiodes 11, 12 and 13 which each receive a sample of the output radiation from the sensing element. The photodiodes 11 to 13 each have a different wavelength response and their outputs in respect of three different wavelengths $\lambda_1$, $\lambda_2$ and $\lambda_3$ are supplied to a processing unit 20. The processing unit 20 provides two outputs, on lines 21 and 22, in accordance with temperature and pressure respectively of the sensing element 3. The lines 21 and 22 extend to respective displays or other utilization devices 23 and 24.

Figure 2:
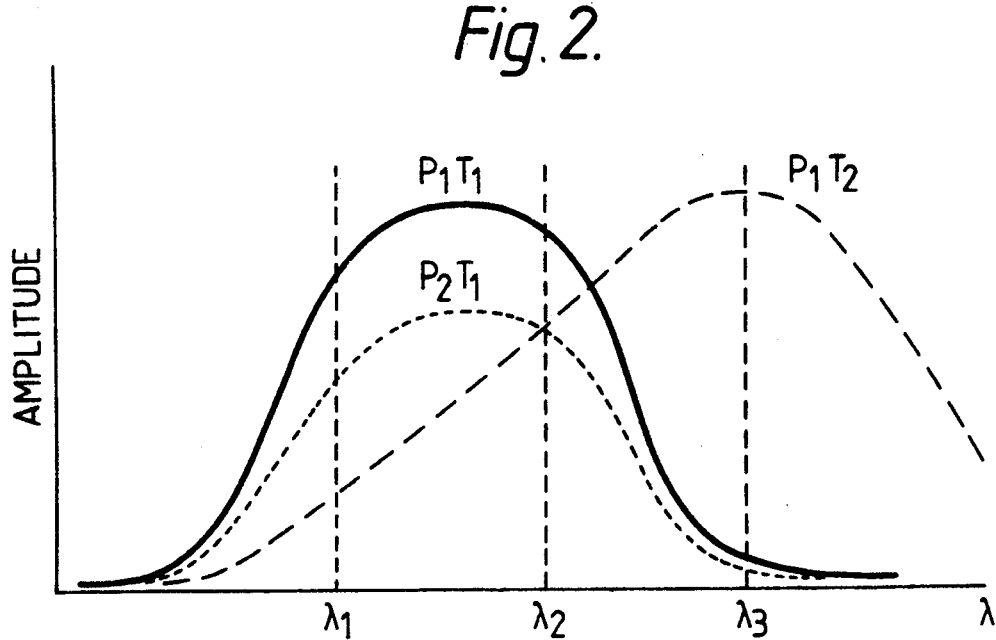
FIG. 2 shows curves illustrating the response of the system.

The sensing element 3 may take several different forms. In one embodiment, the element 3 is of an optically-transparent material and is shaped such that it is stressed by any pressure difference across the partition 70 of the probe. This stress causes a change in the optical properties of the element 3. Any change in temperature also has an effect on the optical properties of the element 3 but in a different way. More particularly, any change in pressure or temperature causes different changes in the transmission characteristics of the element 3. With reference now to FIG. 2, the transmission characteristic at pressure P1 and temperature T1 is shown by the curve $P_1T_1$. An increase in temperature to T2 without any change in pressure causes a displacement of the curve to longer wavelengths as shown by the curve $P_1 T_2$. The change in the curve produced by a change in pressure is of a different kind from that produced by a temperature change, for example, it may cause a displacement of the curve at one end of the response as illustrated by the curve $P_2T_1$. In general, providing that pressure and temperature alter the shape of the curve in different ways, it is possible to identify the contribution to the change in shape caused by both factors. This is achieved by monitoring the radiation levels at various different wavelengths such as the three different wavelengths $\lambda_1$, $\lambda_2$ and $\lambda_3$ detected by the three photodiodes 11 to 13. The greater the number of different wavelengths detected, the more accurate can be the determination of the shape of the curve. Details of sensing elements that are temperature and pressure dependent are given in "Optical fibre based sensing using chromatic modulation" by G. R. Jones et al., Optics and Laser Technology, 19, 6, 297 (1987).

The processing unit 20 is initially characterized by temperature cycling and pressure cycling the sensing element at known values of temperature and pressure, so that a look-up table 200, or similar store of information is produced in which the different amplitudes of radiation at the different wavelengths are associated with different values of temperature and pressure In use, the outputs of the photodiodes 11 to 13 are used to address the store 200 in the processing unit to identify corresponding temperature and pressure values which are supplied to the output lines 21 and 22 respectively.

In this way, it is possible to determine both pressure and temperature using the same sensing element, thereby enabling an indication to be provided of pressure and temperature at the same, that is, a common location. By avoiding the need to use separate sensing elements, the overall size and weight of the sensing system can be kept to a minimum, which may be an advantage, especially in aircraft applications.

Other forms of sensing element could be used in systems of the type described above. These include a vibrating device in which stress applied to the device, such as caused by pressure variations exerted on the sensing element due to changes in gas pressure within the engine 6, alters the resonant frequency, while the Q of the system varies with changes in temperature in the engine. In a system including such an element, the radiation from the sensing element would be supplied at its frequency of vibration to an optical radiation detector, and the resonant frequency and Q would be measured by processing means connected to the detector to provide an indication of pressure and temperature. This form of vibrating device may be excited optically or, for example, by piezoelectric means.

The system could be used with fluids other than gases, such as, for example, liquids.

What I claim is:

1. A sensing system that provides an output in respect of both pressure and temperature changes in an optical sensing element at a common location, comprising a source of alternating optical radiation, said optical sensing element having a resonant frequency that is dependent on pressure and a Q that is dependent on temperature, a probe disposed in a flowing fluid and having an inlet and an outlet, said common location being a location in said flowing fluid, said optical sensing element being located in said probe between said inlet and outlet such that said flowing fluid flows through said probe over said optical sensing element, means supplying optical radiation from said source to said optical sensing element to excite said sensing element optically so as to cause said sensing element to vibrate, an optical radiation detector, means supplying radiation from said sensing element at its frequency of vibration to said detector, and processing means responsive to an output from said detector and operative to provide separate indications of pressure and temperature changes at said common location in accordance with the frequency and Q respectively of said sensing element which are substantially independent of variations in amplitude of the radiation from said source.

* * * * *